US009293148B2

(12) United States Patent
Herger et al.

(10) Patent No.: US 9,293,148 B2
(45) Date of Patent: Mar. 22, 2016

(54) REDUCING NOISE IN A SHARED MEDIA SESSION

(71) Applicant: International Business Machines Corporation, Armonk, NY (US)

(72) Inventors: Lorraine M. Herger, Port Chester, NY (US); Neal M. Keller, Pleasantville, NY (US); Matthew A. McCarthy, Holly Springs, NC (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 13/650,121

(22) Filed: Oct. 11, 2012

(65) Prior Publication Data
US 2014/0105407 A1    Apr. 17, 2014

(51) Int. Cl.
| | | |
|---|---|---|
| H03G 3/20 | (2006.01) | |
| G10L 21/0316 | (2013.01) | |
| H04M 9/08 | (2006.01) | |
| H04M 3/56 | (2006.01) | |

(52) U.S. Cl.
CPC ............ *G10L 21/0316* (2013.01); *H04M 9/08* (2013.01); *H04M 3/56* (2013.01)

(58) Field of Classification Search
CPC ............ H04M 3/42008; H04M 15/09; H04M 15/887; H04W 4/116; H04W 12/02
USPC ........ 381/57, 94.1–94.9, 56, 73.1, 71.2, 71.1; 709/227, 204, 207, 228; 370/260, 261, 370/905; 455/41.2, 41.1, 502
See application file for complete search history.

(56) References Cited

U.S. PATENT DOCUMENTS

| | | | | |
|---|---|---|---|---|
| 5,831,936 | A | 11/1998 | Zlotnick et al. | 367/124 |
| 7,675,873 | B2 * | 3/2010 | Krstulich | 370/260 |
| 8,031,857 | B2 * | 10/2011 | Singh | 379/221.04 |
| 8,218,751 | B2 * | 7/2012 | Hepworth et al. | 379/204.01 |
| 8,581,958 | B2 * | 11/2013 | Baker et al. | 348/14.08 |
| 8,687,039 | B2 * | 4/2014 | DeGrazia et al. | 348/14.12 |
| 8,774,368 | B2 * | 7/2014 | Bentley et al. | 379/32.01 |
| 2006/0073786 | A1 * | 4/2006 | Sarkar | 455/24 |
| 2006/0126538 | A1 * | 6/2006 | Krstulich | 370/260 |
| 2009/0138554 | A1 * | 5/2009 | Longobardi et al. | 709/204 |

(Continued)

FOREIGN PATENT DOCUMENTS

EP    1058925    2/1999    ............ G10L 15/02

OTHER PUBLICATIONS

Chen et al, OneClick: A Framework for Measuring network Quality of Experience, IEEE, 2009.*

*Primary Examiner* — Davetta W Goins
*Assistant Examiner* — Kuassi Ganmavo
(74) *Attorney, Agent, or Firm* — Ido Tuchman; Louis J. Percello

(57) ABSTRACT

A method for reducing noise in a shared media session. An indication is received from one or more of the participants in the shared media session. If the received indication is a first indication that indicates a background noise is present in the shared media session, the following steps are performed: a first counter is incremented for each of the first indications received from one or more of the plurality of participants, it is determined whether a background noise is present in the shared media session if the first counter exceeds a first threshold, an the shared media session is selectively muted such that the background noise is reduced if the background noise is determined to be present in the shared media session.

20 Claims, 15 Drawing Sheets

(56) References Cited

U.S. PATENT DOCUMENTS

2010/0260074 A1* 10/2010 Blouin et al. ................. 370/260
2012/0076315 A1    3/2012 Hetherington et al. ...... 381/71.4
2012/0308044 A1* 12/2012 Vander Mey et al. ......... 381/104

* cited by examiner

REDUCING NOISE IN A SHARED MEDIA SESSION

BACKGROUND

This invention relates to reducing noise in a shared media session. As technology has progressed, people have leveraged innovations so that they can collaborate from remote locations. For example, a corporation's employees may call into a conference call to discuss a particular issue. However, these collaborations have grown to include a large number of participants, e.g., a hundred employees may call into a large corporation's conference call. With such a large number of people on a particular call, background noise may significantly disrupt the call.

In addition, collaborative meetings are also occurring via video conferences or in virtual worlds. Unwanted or inappropriate visual or audio noise can reduce the efficiency of such collaborations. Thus, these media sessions may also be disrupted by audio or visual noise input into the media sessions.

BRIEF SUMMARY

Accordingly, one example of the present invention is a method for reducing noise in a shared media session. The method includes a connecting step for connecting to the shared media session where the shared media session includes a plurality of participants. Each of the participants is associated with one of a plurality of data feeds to the shared media session. A receiving step receives an indication from one or more of the participants. If the received indication is a first indication that indicates a background noise is present in the shared media session, the following steps are performed. An incrementing step increments a first counter for each of the first indications received from one or more of the plurality of participants. A determining step uses a computer processor to determine if the background noise is present in the shared media session if the first counter exceeds a first threshold. A muting step selectively mutes the shared media session such that the background noise is reduced if the computer processor determines the background noise is present in the shared media session.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Figure 1:
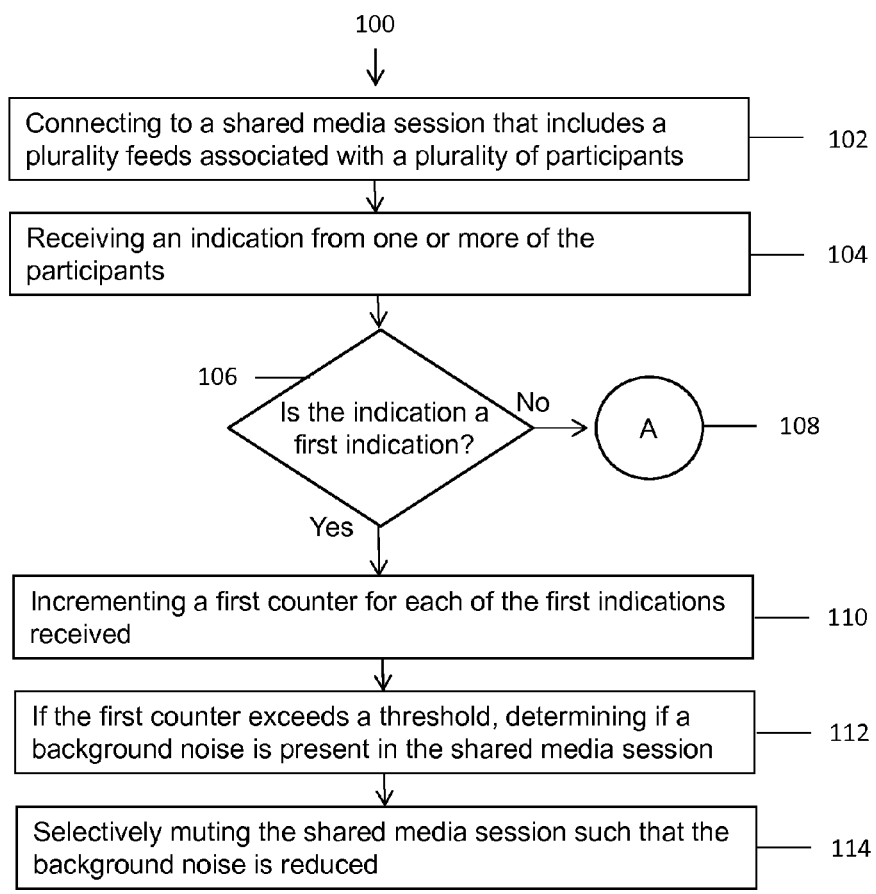
FIG. 1 shows a method for reducing noise in a shared media session according to one embodiment of the present invention.

The present invention is described with reference to embodiments of the invention. Throughout the description of the invention reference is made to FIGS. 1-15. When referring to the figures, like structures and elements shown throughout are indicated with like reference numerals.

Embodiments of the invention include a system and method for reducing unwanted audio or video in a shared media session with participants. The system and method include the detection of noise, a crowd-sourcing counter of alerts due to noise, and a selective muting of the noise based on the detection and the value of the counter. Embodiments may include extensions to virtual worlds and the use of sound libraries and image libraries to aid in detecting undesirable signals.

Often, teleconference meetings involve many participants who are participating or listening to a meeting that is taking place on the phone, in a conference room, in an auditorium, or in some other location. Many participants put their phones on mute mode in order to ensure that the participants' phones do not input any sound into the conference call. However, often one or more of such participants may not be on mute mode, and, thus, various unwanted sounds picked up by the unmuted phones are input into the conference call. For example, unwanted sounds may include static in a data feed, thunder, car horns, a crying baby, and other sounds in the background. Participants may not be on a mute mode for various reasons. For example, they may be careless, do not have a mute function, do not know how to mute their communications devices, or are intentionally unmuted because they wish to speak. As a result, meetings may be noisy, difficult to follow, and unprofessional.

An embodiment of this invention automatically mutes one or more data feeds associated with participants in a shared media session by automatically detecting audio or visual noise, using automated crowd-sourcing to increase the chances of muting a signal that is actually noise, and then either muting the one or more data feeds responsible for the noise or selectively filtering out the noise. By way of example, the meeting may comprise a phone meeting, a video conference, a meeting taking place in a virtual environment, or any other suitable meeting. A data feed may comprise a phone line, an audio and video feed from a computer, a network feed from a computer that allows the user of the computer to interact with a virtual environment, or any other suitable data feed.

According to one embodiment, in a virtual environment scenario, muting a participant may include selectively filtering visual noise when inappropriate subject matter is present in a background image. Examples of a virtual environment include virtual worlds in Second Life or in a massively multiplayer online video game. In virtual environments, both participants and software agents may be represented as avatars.

Certain participants may attempt to disrupt virtual world activities or interactive games either intentionally or unintentionally. In a virtual world embodiment, the selective muting of audio and graphical content in a shared media session may be triggered in a convenient fashion. By way of example, a participant may participate in a crowd-sourced vote to selectively mute the virtual world with an avatar gesture, by selecting a keyboard key, by speaking a word, or by any other suitable signal.

In an embodiment of the invention, during a first step, a noise-detection component detects noise in a shared media session, e.g., unwanted audio in a phone conference. By way of example, noise refers to any unwanted audio or video input from a remote participant in a shared media session. Examples of audio noise may include screaming, fire alarms, mouse clicks, keyboard noises, a data feed that includes static, thunder, car horns, a crying baby, and other sounds in the background. For example, in a virtual environment scenario, it may be desirable to mute or selectively filter a shared media session when inappropriate subject matter is present in a background image.

In an embodiment, during a second step, a crowd-source detection component detects one or more indications from a crowd, e.g., an indication from meeting participants that noise is present in the shared media session. In an embodiment, in order to decrease the probability that an automated muting takes place improperly, participants provide a crowd-source signal to indicate the presence of noise.

In an embodiment, during a third step, when the number of detected indications from the crowd is greater than a threshold, then one or more of the noisy data feeds may be ascertained and muted. For example, if the number of people requesting a mute exceeds three, the mute unit searches for one or more noisy data feeds and then mutes the one or more noisy data feeds. This decreases the number of automatic involuntary mutes in scenarios when non-traditional sounds may actually be part of a desired transmission, such as a presentation involving music. Participants may indicate that noise is present in the shared media session in many ways, for example, pressing a key on a phone, computer keyboard, or any other suitable manner.

In an embodiment, participants may indicate the presence of noise with increased specificity by selecting more than one key to indicate a problem, e.g., key 1 for what sounds like a static in a line and key 2 for what sounds like traffic or crowd noises. By way of example, this form of user collaboration may be important for meetings held in virtual environments that have noise in the form of undesirable or inappropriate images.

In an embodiment, in order to facilitate the detection of audio noise, a library of sound signatures may be stored in a sound database and may be used to help classify typical kinds of audio noise, e.g., clicking of keyboard keys. The sound database may contain information supplied by any of: a service provider, participants of shared media sessions, and other sources. Sounds may be classified, clustered, and tagged with annotations that include textual descriptions of the unwanted sounds. In an embodiment, redundant sound samples can be stored to account for differences in recording quality.

In an embodiment, a system may store potential participant voices in the sound library. This may be used, for example, as an aid to determining which participants are associated with a noise. It may also be used to help allow actual meeting participant voices to be heard or to be permitted without muting. For example, a voice signal from a data feed can be compared to the voice samples in the sound database, and voices that do not match a stored voice sample may be more likely to be determined to be noise and ultimately selectively muted. For instance, if Bob is the Vice President who has participated in past calls and Alice is his wife, who has never participated, the voice recognition of Bob may be used to decrease the chances that he is muted relative to Alice's voice, which is more likely to be muted.

In an embodiment, sound comparisons between sounds in a noisy data feed, e.g. a crying baby or keyboard clicks detected in the background, and stored waveforms of a baby crying or keyboard clicks may be accomplished through known means involving any of: fast Fourier transforms, spectrograms, sliding window FFT/DFT (fast Fourier transform/discrete Fourier transform) with examination of the spectral energy density of various frequency groups. By way of example, the sound comparisons between the detected sounds in the noisy data feeds and the stored waveforms may also employ the methods used in the commonly available software product Audio Quality Analyzer (AQuA).

In an embodiment, an images library of inappropriate images stored in an image database may be used to help classify unwanted images. For example, in order to facilitate the detection of unwanted symbols, avatars, signs, text, graphics, and other images in a virtual environment, a large library of image signatures may be used to help classify unwanted images. By way of example, unwanted images may include a malicious or accidental avatar holding a sign with adult content or inappropriate words, symbols, or logos. Inappropriate content may also include trademarked subject matter or confidential material. These types of unwanted images or inappropriate content may constitute visual background noise. Thus, even well-meaning avatars can accidentally convey confidential text or trademarked logos, and the detection of such images will allow these images to be selectively muted.

In an embodiment, muting may refer to a total muting of audio, visual, or both, e.g., blacking out the visual. Muting may also refer to a partial muting of sound, visual, or both, e.g., a filtering out a high-frequency static but allowing the line to be unmuted otherwise. In an embodiment, it may be possible to determine voice sounds from non-voice sounds, e.g., thunder, based on power spectral analysis and use of a sound database described above.

In an embodiment, motion detectors may be used to detect the sudden appearance of other people in the visual field of a camera and thus increase the chances that this new visual data may be a candidate to be selectively muted. The automated use of muting in these kinds of situations may be requested by certain users and the request stored or indicated in a user profile by a user or third party. For example, some users at home, with children, may request this feature. A participant that desires for the data feed associated with that him or her to be selectively muted may send an indication that is different from the indication that indicates there is a noise in the shared media session. In an example, a participant's voice may be identified, and voices that are not the voice of the participant may be muted.

In an embodiment involving a virtual environment, sources of unwanted audio and video may include: a participant's avatar behaving inappropriately, e.g., an avatar behaving improperly because the participant that controls the avatar is a beginner, inappropriate background images, and the presence of participants' avatars that intentionally behave improperly. Other sources of unwanted content in a virtual environment include inappropriate graphics and text near a conference, meeting, interview, or some other gathering.

In an embodiment, during a fourth step, a feedback aggregation component may collect and summarize feedback from data feeds associated with the participants including any data feeds determined to be noisy in order to enable the system to learn over time. By way of example, active learning may be used to disambiguate sounds that cannot be categorized above some criterion confidence level. This may trigger an active learning component that can enlist the help of either a remote expert or a service call where additional human categorization capabilities may be tapped and exploited to expand the systems capabilities in the future. Inputs from the feedback aggregation component may be used to improve the classifying, clustering and tagging of sounds for all users and to identify the source of specific sounds for specific users to enable a more granular filtering of noisy data feeds via specific reminders to the offenders regarding the source and possible mitigation of specific audio or video noise.

In an embodiment, the system may determine that a noise presented in a shared media session comprises a portable fan noise. By way of example, the noise may be determined using one or more of the feedback aggregation component and the sound database which includes a library of sound signatures. The system may further determine that the noise is being presented by a particular noisy data feed connected to the shared media session. In an embodiment, the system may send a signal to the participant associated with the noisy data feed that indicates that a noise determined to be a noisy fan has been detected in the participant's data feed so that the participant can eliminate the noise. By way of example, the system may use the feedback aggregation component and the sound database to determine a variety of sounds.

In an embodiment, the feedback aggregation component may additionally store history information that describes types of noise or sources of noise a participant has presented in past media sessions. In an example, the system may determine that a noisy feed is presenting beeps from an email-alert system in a shared media session. In an embodiment, the system may send the participant associated with the noisy feed a reminder that the beep sounds have been a noise problem in the past and that the user should consider turning off the email-alert sounds. By way of example, the system may use the feedback aggregation component to determine a variety of sounds.

In an embodiment, the system may access a profile associated with a participant in a shared media session. By way of example, the profile may store history information describing the types of noise or sources of noise the participant has presented in past shared media sessions. In an embodiment, the system may send a message to the participant associated with the profile prior to the commencement of the shared media session to remind the participant of the past noises associated with that participant. For example, a participant may have presented beeping noises from an email-alert system and barking noises from a dog in past shared media sessions. Using the profile for such a participant, the system may send a message to the participant that describes these noises prior to the commencement of a shared media session. Thus, the participant will have the opportunity to disable the sound on an email-alert system and take the dog outside so that it will not be heard in the shared media session.

In an embodiment, the system may keep track of a history of noise types and occurrences for various meeting participants, e.g. dog barking in 1 of 3 prior meetings for Bob, and learn to be more alert to such kinds of noise in future calls. For example, the probability that an audio signal is noise is increased if, in the past, a particular caller had noise of a particular kind.

In an embodiment where meetings are presented with multiple windows displayed on a GUI, e.g. ten windows showing ten different meeting participants, a muting or partial muting may take the form of coloration, dimming of window brightness, or other graphical change, applied to the window to indicate the source of noise. Also, in those meeting systems for which a window focus may change depending on audio associated with the window, such a focus will not change to a window that is associated with noise.

FIG. 1 shows a method for reducing noise in a shared media session according to one embodiment of the present invention. The method includes a connecting step 102. During the connecting step 102, a shared media session is connected to, where the shared media session includes a plurality of participants associated with one of a plurality of data feeds that connect the participants to the shared media session. After the connecting step 102 is completed, the method continues to receiving step 104.

At receiving step 104, an indication is received from one or more of the participants. After the receiving step 104 is completed, the method continues to determining step 106. At determining step 106, it is determined whether the received indication is a first indication that indicates a background noise is present in the shared media session. If the received indication is a first indication, the method continues to incrementing step 110. If the received indication is not a first indication, the method continues to branch step 108.

At incrementing step 110, a first counter is incremented for each of the first indications received from one or more of the plurality of participants. By way of example, the first counter may be incremented for each indication received from a unique participant. After the incrementing step 110 is completed, the method continues to determining step 112. At determining step 112, it is determined whether a background noise is present in the shared media session if the first counter exceeds a first threshold. After the determining step 112 is completed, the method continues to muting step 114. At muting step 114, the shared media session is selectively muted such that the background noise is reduced if it is determined that a background noise is present in the shared media session.

Figure 2:
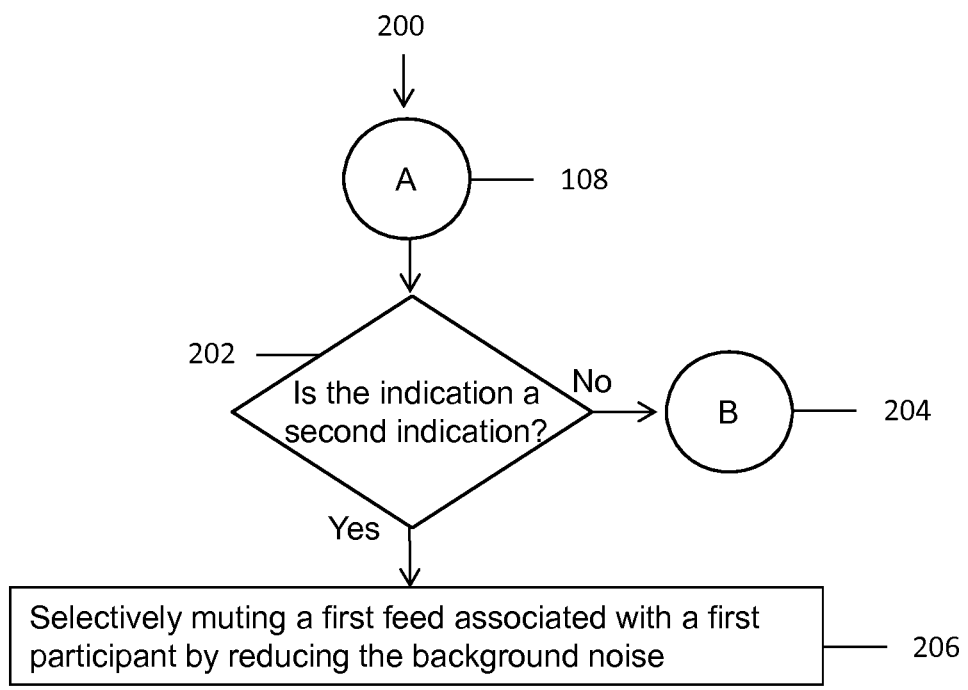
FIG. 2 shows a method for reducing noise in a shared media session by selectively muting a first data feed according to one embodiment of the present invention.

FIG. 2 shows a method for reducing noise in a shared media session by selectively muting a first data feed according to one embodiment of the present invention. The method of FIG. 2 may be implemented in connection with the method of FIG. 1. For example, at determining step 106 of FIG. 1, if it is determined that a received indication is not a first indication, the method continues to branch step 108 of FIG. 2. From branch step 108 of FIG. 2 the method continues to determining step 202.

At determining step 202, it is determined whether the received indication is a second indication received from a first participant that indicates the first participant desires to be selectively muted. If the received indication is a second indication, the method continues to muting step 206. If the received indication is not a second indication, the method continues to branch step 204. At muting step 206, a first data feed associated with the first participant is selectively muted by reducing the background noise from the first data feed.

Figure 3:
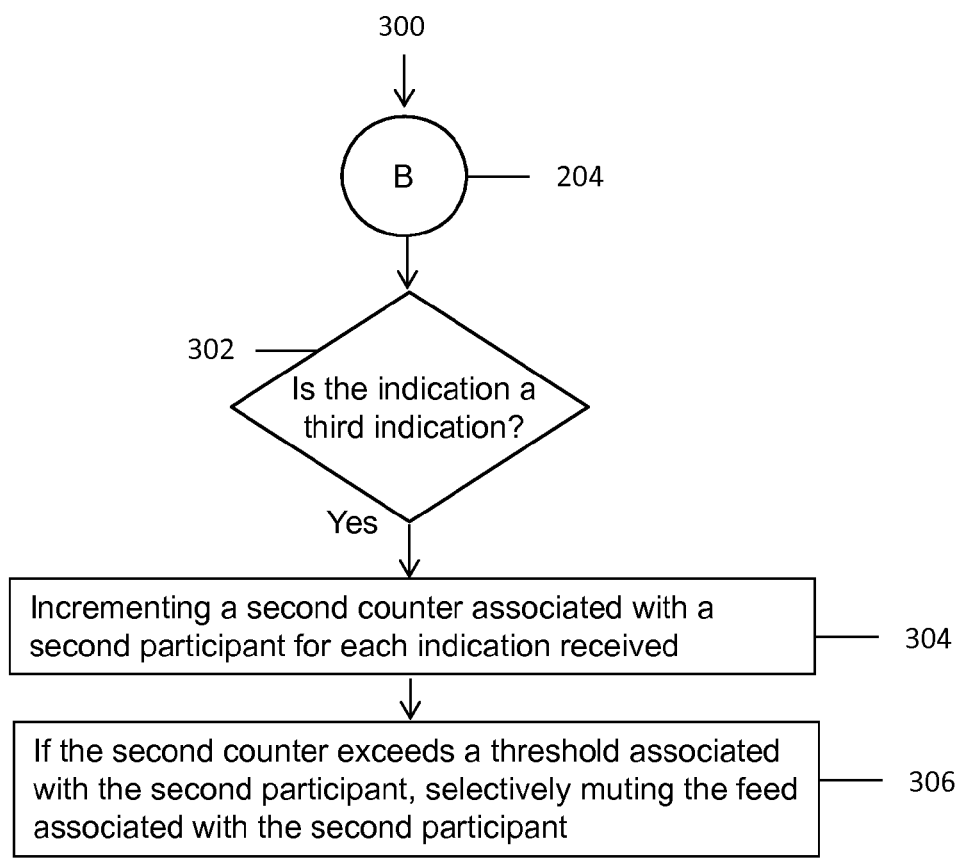
FIG. 3 shows a method for reducing noise in a shared media session by selectively muting a second data feed according to one embodiment of the present invention.

FIG. 3 shows a method for reducing noise in a shared media session by selectively muting a second data feed according to one embodiment of the present invention. The method of FIG. 3 may be implemented in connection with the methods of FIG. 1 and FIG. 2. For example, at determining step 202 of FIG. 2, if it is determined that a received indication is not a second indication, the method continues to branch step 204 of FIG. 3. From branch step 204 of FIG. 3 the method continues to determining step 302.

At determining step 302, it is determined whether the received indication is a third indication that indicates a second data feed associated with a second participant is noisy in the shared media session. If the received indication is a third indication, the method continues to incrementing step 304.

At incrementing step 304, a second counter associated with the second participant is incremented for each of the third indications received from one or more of the plurality of participants. By way of example, the second counter may be incremented for each indication received from a unique participant. After the incrementing step 304 is completed, the method continues to muting step 306. At muting step 306, the second data feed associated with the second participant is selectively muted if the second counter exceeds a second threshold. In an embodiment, the second data feed may be selectively muted by selectively muting an audio component of the data feed, a video component of the data feed, or a combination.

Figure 4:
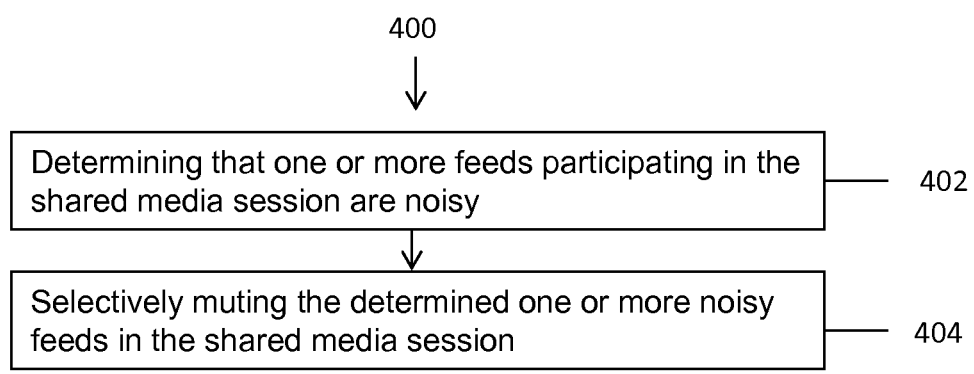
FIG. 4 shows a method for selectively muting a data feed associated with a participant of a shared media session in accordance with an embodiment of the invention.

FIG. 4 shows a method for selectively muting a data feed associated with a participant of a shared media session in accordance with an embodiment of the invention. For example, muting step 114 of FIG. 1 may further include the method steps of FIG. 4.

The method of FIG. 4 includes a determining step 402. At determining step 402, it is determined that one or more data feeds participating in the shared media session are noisy. After the determining step 402 is completed, the method continues to muting step 404. At muting step 404, the determined noisy data feeds participating in the shared media session are selectively muted.

Figure 5:
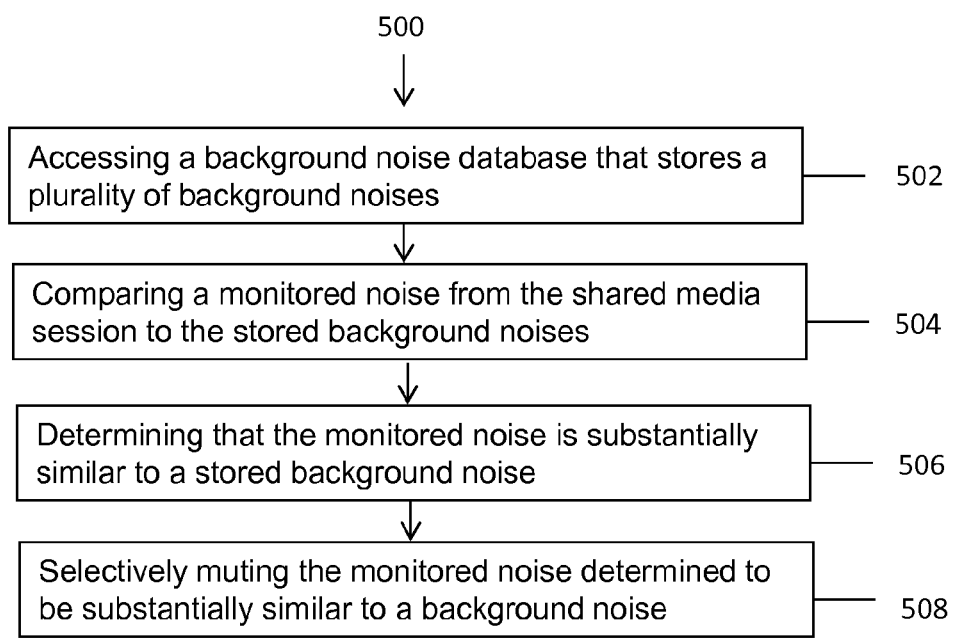
FIG. 5 shows a method of determining if a background noise is present in a shared media session using a background noise database in accordance with an embodiment of the invention.

FIG. 5 shows a method of determining if a background noise is present in a shared media session in accordance with an embodiment of the invention. For example, determining step 112 of FIG. 1 may further include the method steps of FIG. 5.

The method of FIG. 5 includes an accessing step 502. At accessing step 502, a background noise database is accessed. By way of example, the background noise database stores a plurality of predetermined background noises. After the accessing step 502 is completed, the method continues to comparing step 504. At comparing step 504, a monitored noise from the shared media session is compared to the stored background noises. After the comparing step 504 is completed, the method continues to determining step 506.

At determining step 506, it is determined whether the monitored noise is substantially similar to one of the stored background noises. After the determining step 506 is completed, the method continues to muting step 508. At muting step 508, the monitored noise that was determined to be substantially similar to a stored background noise is selectively muted.

Figure 6:
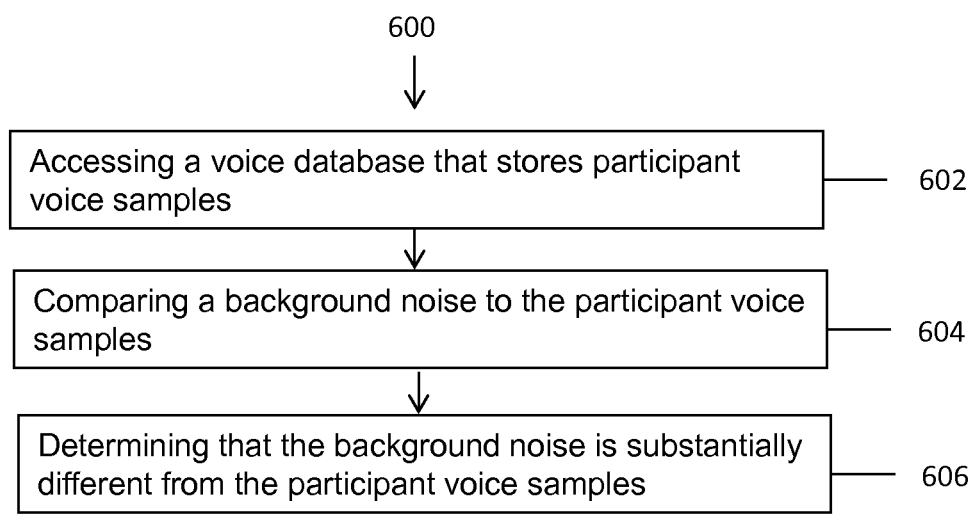
FIG. 6 shows a method of determining if a background noise is present in a shared media session using a voice database in accordance with an embodiment of the invention.

FIG. 6 shows a method of determining if a background noise is present in a shared media session in accordance with an embodiment of the invention. For example, determining step 112 of FIG. 1 may further include the method steps of FIG. 6.

The method of FIG. 6 includes an accessing step 602. At accessing step 602, a voice database is accessed. By way of example, the voice database stores a plurality of voice samples from participants of the shared media session. After the accessing step 602 is completed, the method continues to comparing step 604. At comparing step 604, a background noise from the shared media session is compared to the stored voice samples. After the comparing step 604 is completed, the method continues to determining step 606.

At determining step 606, it is determined that the background noise is substantially different from the stored voice samples. By way of example, determining step 112 of FIG. 1 may conclude that a background noise is present in the shared media session if the background noise is substantially different from the stored voice samples.

Figure 7:
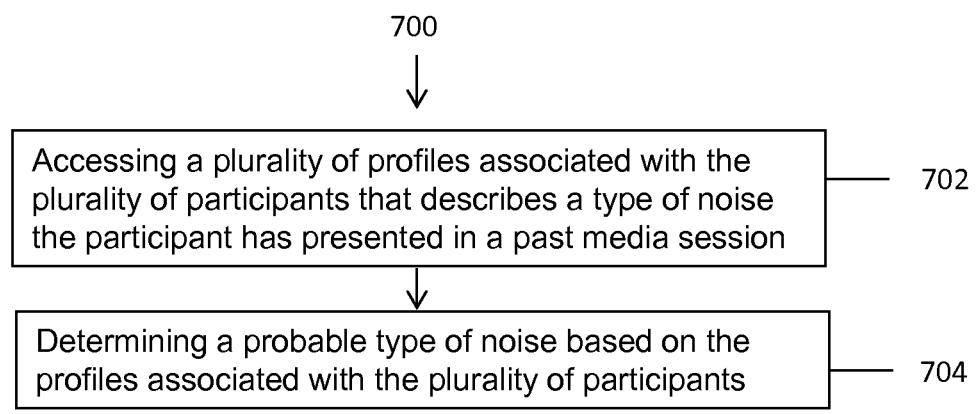
FIG. 7 shows a method of determining if a background noise is present in a shared media session using profile information in accordance with an embodiment of the invention.

FIG. 7 shows a method of determining if a background noise is present in a shared media session in accordance with an embodiment of the invention. For example, determining step 112 of FIG. 1 may further include the method steps of FIG. 7.

The method of FIG. 7 includes an accessing step 702. At accessing step 702, a plurality of profiles associated with participants of the shared media session are accessed. By way of example, the profiles may be stored in a profile database. In an embodiment, a profile associated with a participant includes noise information that describes a type of noise that the participant has presented in past shared media sessions. After the accessing step 702 is completed, the method continues to determining step 704. At determining step 704, a probable type of noise is determined based on the profiles associated with the participants of the shared media session. By way of example, profiles associated with participants of the shared media session may be accessed, and a probable type of background noise may be determined based on the noise information included in the profiles.

Figure 8:
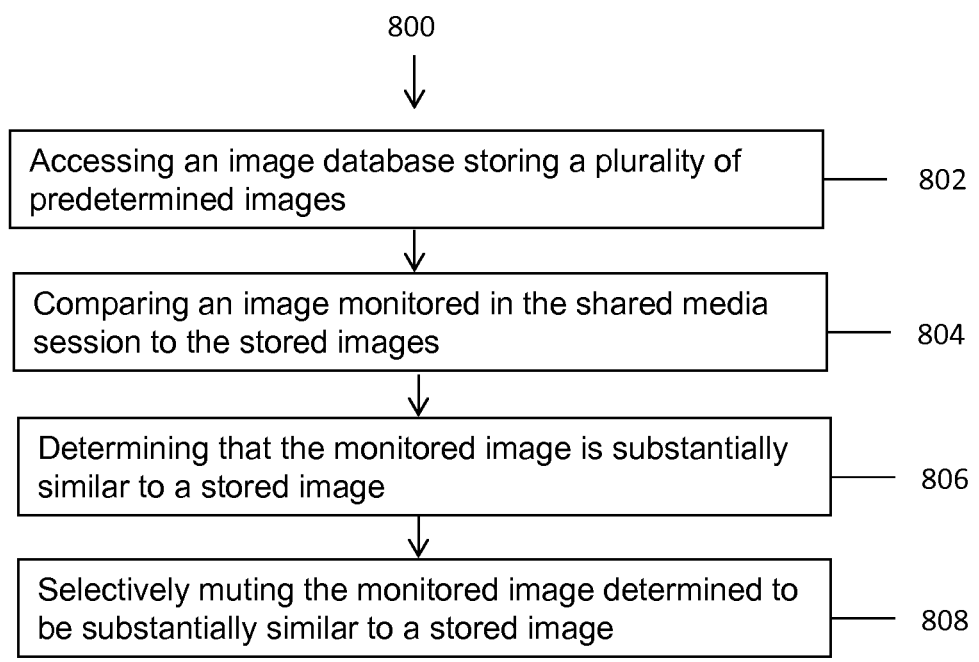
FIG. 8 shows a method of determining if a background noise is present in a shared media session using an image database in accordance with an embodiment of the invention.

FIG. 8 shows a method of determining if a background noise is present in a shared media session in accordance with an embodiment of the invention. For example, determining step 112 of FIG. 1 may further include the method steps of FIG. 8.

By way of example, the shared media session may comprise of a virtual environment that simulates the physical presence of participants in a computer generated environment. The method of FIG. 8 includes an accessing step 802. At accessing step 802, an images database is accessed. By way of example, the images database stores a plurality of predetermined images. In an embodiment, the predetermined images include offensive or improper images. After the accessing step 802 is completed, the method continues to comparing step 804. At comparing step 804, a monitored image from the shared media session is compared to the stored images. After the comparing step 804 is completed, the method continues to determining step 806.

At determining step 806, it is determined whether the monitored image is substantially similar to one of the stored images. After the determining step 806 is completed, the method continues to muting step 808. At muting step 808, the monitored image that was determined to be substantially similar to a stored image is selectively muted.

Figure 9:
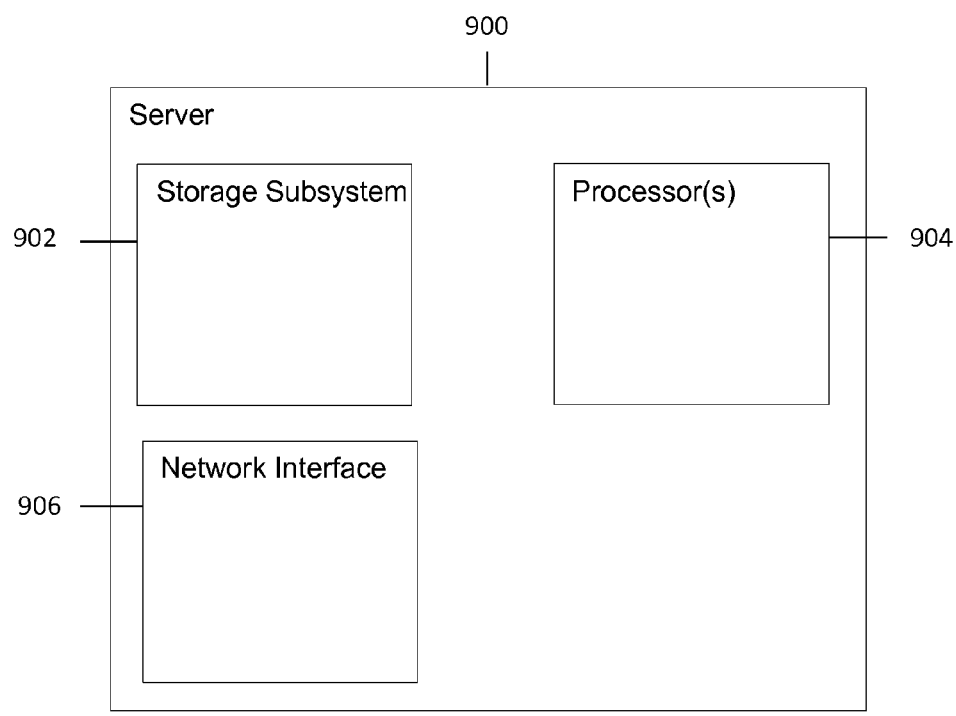
FIG. 9 shows a server for reducing noise in a shared media session in accordance with an embodiment of the invention.

FIG. 9 shows a server 900 for reducing noise in a shared media session in accordance with an embodiment of the invention. For example, server 900 of FIG. 9 may be used to implement the method steps of FIGS. 1-8. Server 900 includes storage subsystem 902, Processor(s) 904, and network interface 906.

Storage subsystem 902 included in server 900 may comprise of a hard disk, a random access memory (RAM), a read-only memory (ROM), an erasable programmable read-only memory (EPROM or Flash memory), or any other suitable storage device or combinations thereof. Processor(s) 904 included in server 900 may comprise of one or more computer processors.

Figure 10:
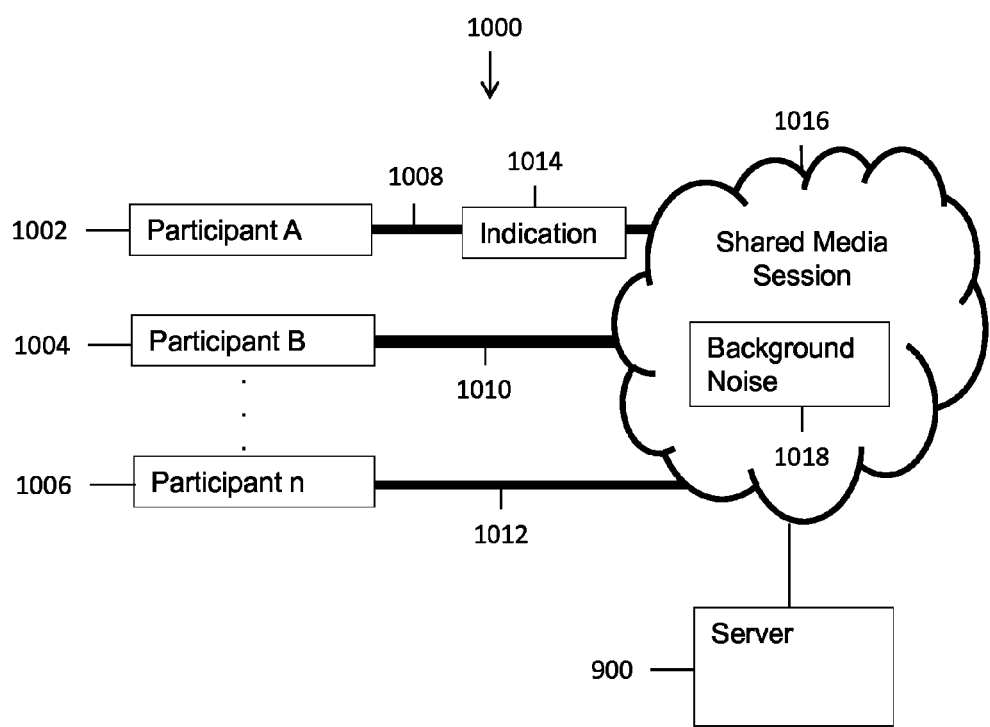
FIG. 10 shows a system for reducing noise in a shared media session in accordance with an embodiment of the invention.
Figure 11:
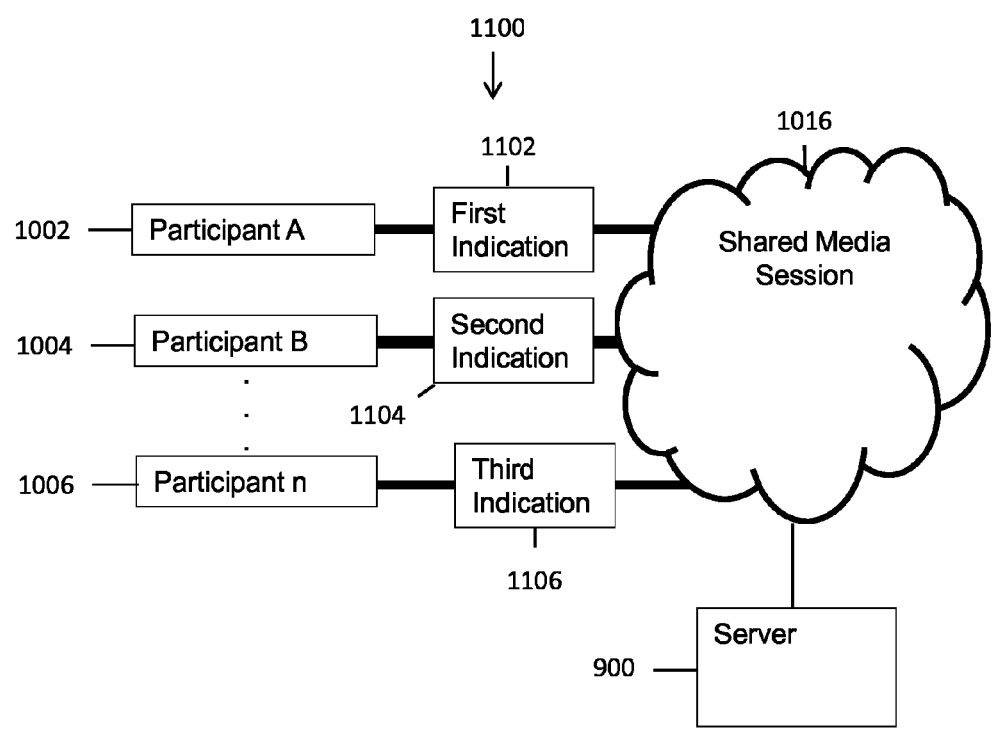
FIG. 11 shows a system for receiving participant indications in accordance with an embodiment of the invention.

FIGS. 10-13 show system embodiments of the invention. FIG. 10 shows a system 1000 for reducing noise in a shared media session in accordance with an embodiment of the invention. FIG. 10 includes participants 1002, 1004, and 1006, data feeds 1008, 1010, and 1012, indication 1014, shared media session 1016, and background noise 1018. FIG. 11 shows a system 1100 for receiving participant indications in accordance with an embodiment of the invention. FIG. 11 includes a first indication 1102, a second indication 1104, and a third indication 1106.

Figure 12:
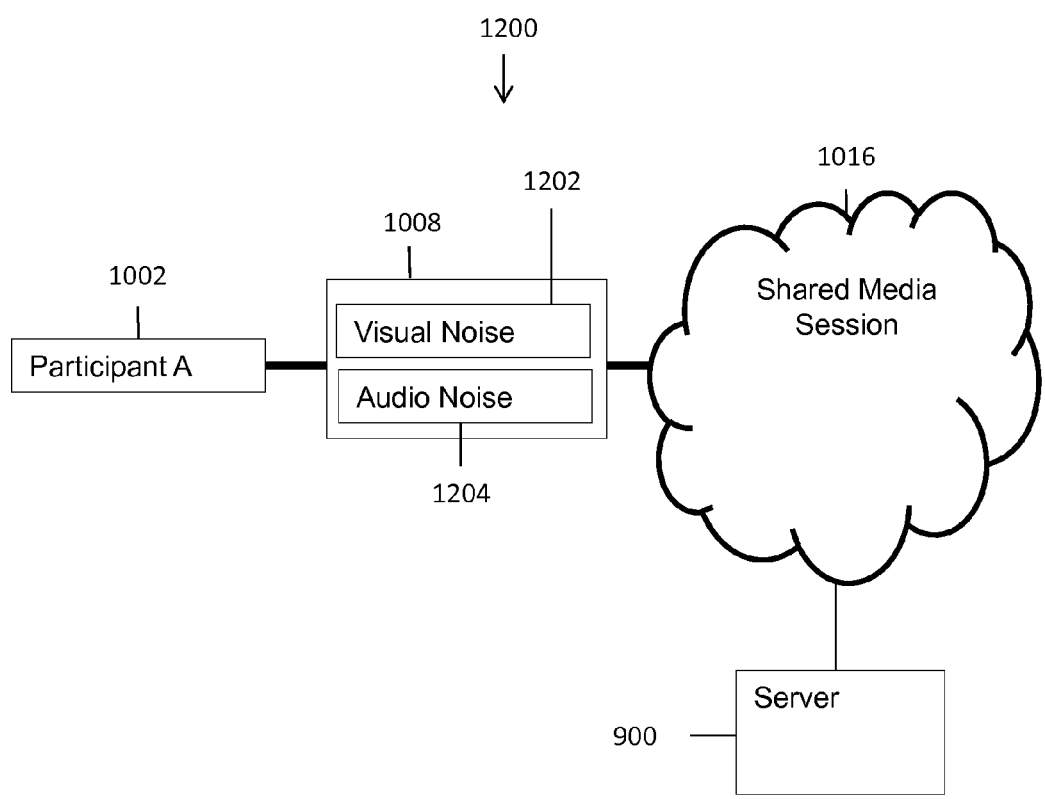
FIG. 12 shows a system for reducing noise from a data feed in a shared media session in accordance with an embodiment of the invention.
Figure 13:
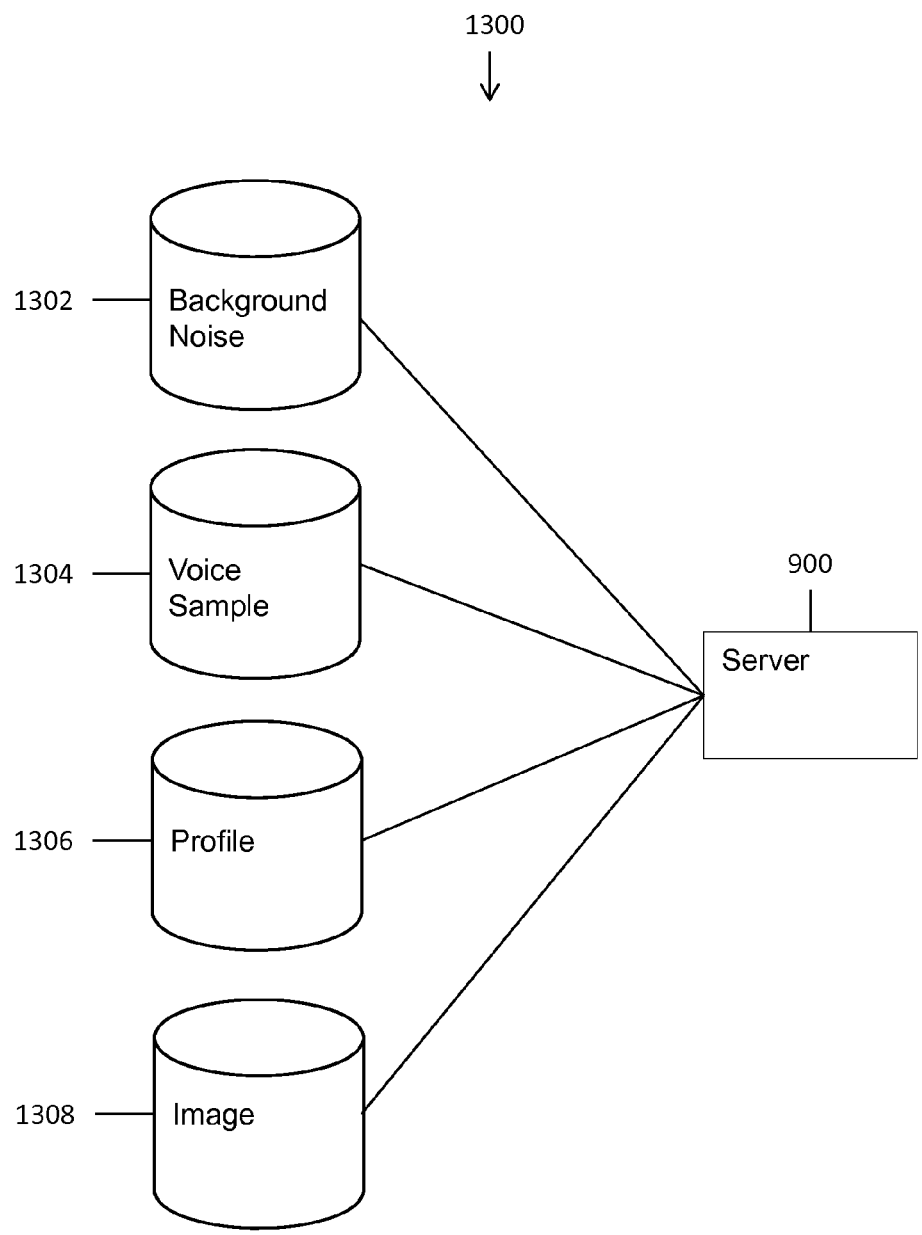
FIG. 13 shows databases accessed by a server in accordance with an embodiment of the invention.

FIG. 12 shows a system 1200 for reducing noise from a data feed in a shared media session in accordance with an embodiment of the invention. FIG. 12 includes visual noise 1202 and audio noise 1204. FIG. 13 shows databases accessed by server 900 of FIG. 9 in accordance with an embodiment of the invention. FIG. 13 includes background noise database 1302, voice sample database 1304, a profile database 1306, and image database 1308.

Figure 14:
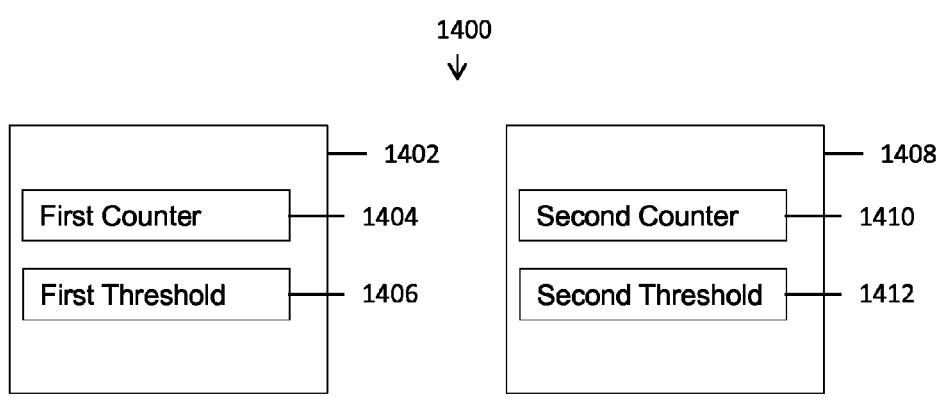
FIG. 14 shows threshold and counter data in accordance with an embodiment of the invention.
Figure 15:
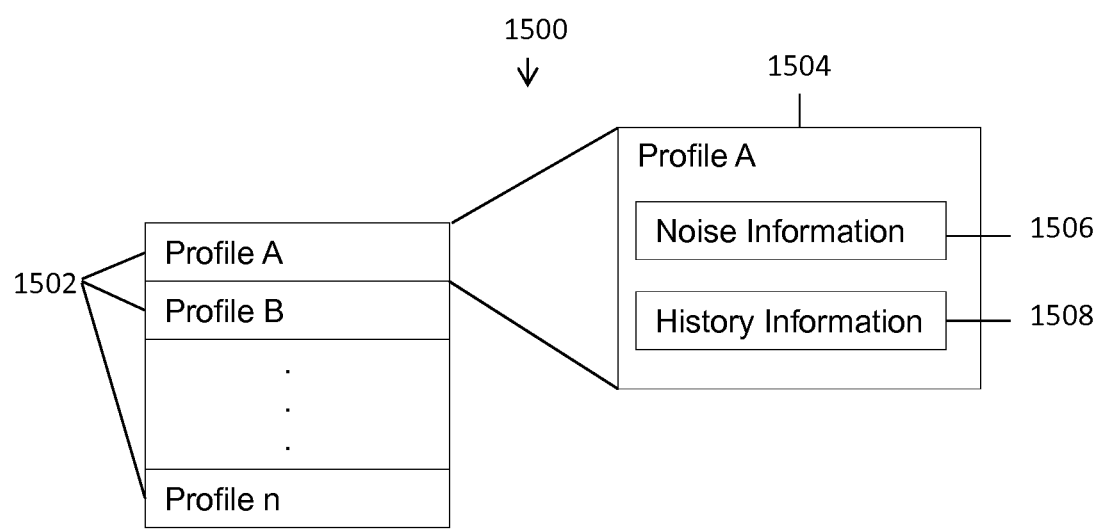
FIG. 15 shows profile information in accordance with an embodiment of the invention.

FIGS. 14 and 15 show data structures used in an embodiment of the invention. FIG. 14 shows threshold and counter data in accordance with an embodiment of the invention. FIG. 14 includes first indication data structure 1402 with first counter 1404 and first threshold 1406 and second indication data structure 1408 with second counter 1410 and second threshold 1412. FIG. 15 shows profile information in accordance with an embodiment of the invention. FIG. 15 includes profiles 1502, profile A 1504, noise information 1506, and history information 1508.

In an embodiment, the server 900 of FIG. 9, the systems of FIGS. 10-13, and the data structures of FIGS. 14 and 15 are used in combination. By way of example, the figures may be used in any configuration suitable to operate the invention.

In an embodiment, server 900 connects to a shared media session 1016. The shared media session may comprise of a conference call, a video meeting, a meeting in a virtual environment, or any other suitable shared media session. By way of example, the shared media session 1016 includes a plurality of data feeds 1008, 1010, and 1012 that are associated with a plurality of participants 1002, 1004, and 1006. In an embodiment, data feeds 1008, 1010, and 1012 may comprise of audio feeds, video feeds, or a combination. By way of example, an audio feed may include a phone line connected to a conference call and a video feed may include a computer and camera connected via the Internet to a remote computer. Server 900 receives one or more indications from one or more of the participants 1002, 1004, or 1006. In an embodiment, server 900 receives indication 1014 from participant 1002. By way of example, the received indication 1014 may comprise a first indication 1102, a second indication 1104, or a third indication 1106.

In an embodiment, if the received indication 1014 is a first indication 1102 indicating that background noise 1018 is present in the shared media session 1016, a first counter 1404 is incremented for each of the first indications 1102 received from one or more of the plurality of participants 1002, 1004, and 1006. By way of example, the first counter 1404 may be incremented for each indication received from a unique participant. In an embodiment, if the first counter 1404 exceeds a first threshold 1406, server 900 determines whether background noise 1018 is present in the shared media session 1016. If background noise 1018 is determined to be present in the shared media session 1016, server 900 selectively mutes shared media session 1016 such that background noise 1018 is reduced.

In an embodiment, when received indication 1014 is a first indication 1102, server 900 further determines if one or more data feeds participating in shared media session 1016 are noisy. If one or more data feeds are determined to be noisy, server 900 selectively mutes the determined noisy data feeds.

In an embodiment, server 900 selectively mutes shared media session 1016 by partially muting or fully muting a data feed associated with a participant of media session 1016. By way of example, shared media session 1016 may comprise a video session and partially muting a data feed associated with a participant of shared media session 1016 includes suppressing visual noise other than the visual representation of the participant from the data feed. By way of example, shared media session 1016 may comprise an audio session and partially muting a data feed associated with a participant of shared media session 1016 includes suppressing audio noise other than the participant's voice from the data feed.

In an embodiment, when received indication 1014 is a first indication 1102, server 900 uses data stored in various databases operatively connected to server 900 in order to determine whether background noise 1018 is present in shared media session 1016. For example, server 900 may be operatively connected to background noise database 1302, voice sample database 1304, profile database 1306, image database 1308, or a combination of the databases.

In an embodiment, background noise database 1302 stores background noises. By way of example, the stored background noises are predetermined background noises that are determined to be possible background noises for media session 1016. In an embodiment, voice sample database 1304 stores voice samples. By way of example, the stored voice samples are voice samples from participants 1002, 1004, and 1006 of the shared media session 1016. In an embodiment, profile database 1306 stores participant profiles 1502. By way of example, participant profiles 1502 include noise information 1506 and history information 1508. In an embodiment, image database 1308 stores images. By way of example, the stored images are predetermined images that are determined to be offensive or inappropriate.

In an embodiment, when determining whether background noise 1018 is present in shared media session 1016, server 900 accesses background noise database 1302. Server 900 then compares a monitored noise from shared media session 1016 to the stored background noises from database 1302. Based on the comparison, server 900 determines whether the monitored noise is substantially similar to a stored background noise from database 1302. If the monitored noise is determined to be substantially similar to a stored background noise, server 900 selectively mutes shared media session 1016 by selectively muting the monitored noise determined to be substantially similar to a stored background noise.

In an embodiment, when determining whether background noise 1018 is present in shared media session 1016, server 900 accesses voice database 1304. Server 900 then compares a monitored noise from shared media session 1016 to the stored voice samples from database 1304. Based on the comparison, server 900 determines whether the monitored noise is substantially different from the stored voice samples from database 1304. By way of example, if the monitored noise is not determined to be substantially different from the stored voice samples from database 1304, server 900 will determine that the monitored noise is not a background noise in shared media session 1016.

In an embodiment, when determining whether background noise 1018 is present in shared media session 1016, server 900 accesses profile database 1306. By way of example, server 900 accesses profile A 1504 associated with a participant of the shared media session 1016. Profile A may include noise information 1506 that describes a type of noise that the participant associated with the profile has presented in past shared media sessions. Server 900 then determines a probable type of noise based on the profiles associated with the participants of the shared media session 1016. By way of example, profiles associated with participants may be accessed, and a probable type of background noise may be determined based on the noise information included in the accessed profiles.

In an embodiment, shared media session 1016 may comprise of a virtual environment that simulates the physical presence of participants 1002, 1004, and 1006 in a computer generated environment. By way of example, the virtual environment may include images. In an embodiment, when determining whether background noise 1018 is present in shared media session 1016, server 900 may access image database 1308. Server 900 then compares a monitored image from shared media session 1016 to the stored images from database 1308. Based on the comparison, server 900 determines whether the monitored image is substantially similar to a stored image from database 1308. If the monitored image is determined to be substantially similar to a stored image, server 900 selectively mutes shared media session 1016 by selectively muting the monitored image determined to be substantially similar to a stored image.

In an embodiment, if the received indication 1014 is a second indication 1104 received from a first participant 1002 indicating that the first participant 1002 desires to be selectively muted, server 900 selectively mutes data feed 1008 associated with first participant 1002 by reducing the background noise from data feed 1008. By way of example, data feed 1008 may include a visual component and server 900 may selectively mute visual background noise 1202 from data feed 1008. By way of example, data feed 1008 may include an audio component and server 900 may selectively mute audio background noise 1204 from data feed 1008.

In an embodiment, if the received indication 1014 is a third indication 1106 indicating that a second data feed 110 associated with a second participant 1004 is noisy, server 900 increments a second counter 1410 associated with second participant 1004 for each indication received about second participant 1004. By way of example, a third indication is sent by a participant about the data feed of another participant. In other words, a third indication is not sent by a participant to indicate that the data feed associated with that sending participant is noisy, but rather to indicate that a data feed associated with another participant is noisy. If the second counter 1410 exceeds a second threshold 1412 associated with the second participant 1004, the server 900 selectively mutes the second data feed 1010. By way of example, the second data feed 1010 includes an audio component, a video component, or a combination, and selectively muting the second data feed 1010 includes selectively muting the audio component, the video component, or a combination.

In an embodiment, a profile is associated with second participant 1004. For example, profile database 1306 stores profiles 1502, where the stored profiles include history information 1508. In an embodiment, history information 1508 included in Profile A 1504 describes a probability that the associated participant will be noisy in a shared media session. By way of example, the profile associated with participant 1004 includes history information that describes the probability that participant 1004 will be noisy in a shared media session. In an embodiment, second threshold 1412 is adjusted based on the profile associated with second participant 1004. By way of example, second threshold 1412 may be adjusted up or down based on the history information included in the profile associated with second participant 1004.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the market-place, or to enable others of ordinary skill in the art to understand the embodiments disclosed herein.

What is claimed is:

1. A method for reducing noise in a shared media session, the method comprising:
   connecting to the shared media session, the shared media session including a plurality of participants, each of the participants being associated with one of a plurality of data feeds to the shared media session;
   receiving a first indication from one or more of the participants, the first indication indicates a background noise is present in the shared media session;
   incrementing a first counter for each of the first indication received from one or more of the plurality of participants;
   upon the first counter exceeding a first threshold, determining by a computer processor if the background noise is present in the shared media session; and
   selectively muting a first data feed of the plurality of data feeds to the shared media session such that the background noise is reduced upon the computer processor determining the background noise is present in the shared media session;
   wherein the first data feed includes an audio signal; and
   wherein selectively muting the first data feed includes selectively muting audio background noise from the first data feed.

2. A method as in claim 1, further comprising:
   upon receiving a second indication from a first participant that indicates the first participant desires to be selectively muted, selectively muting the first data feed associated with the first participant by reducing the background noise from the first data feed.

3. A method as in claim 2, further comprising:
   wherein the first data feed includes a video signal; and
   wherein selectively muting the first data feed includes selectively muting visual background noise from the first data feed.

4. A method as in claim 1, further comprising determining that the background noise is present in the shared media session by determining that one or more data feeds participating in the shared media session are noisy.

5. A method as in claim 4, further comprising selectively muting the shared media session by selectively muting the determined one or more noisy data feeds in the shared media session.

6. A method as in claim 1, wherein determining if the background noise is present in the shared media session comprises:
   accessing a background noise database, the background noise database storing a plurality of predetermined background noises;
   comparing a monitored noise from the shared media session to the stored background noises; and
   determining that the monitored noise is substantially similar to a stored background noise.

7. A method as in claim 6, further comprising selectively muting the shared media session by selectively muting the monitored noise determined to be substantially similar to a stored background noise.

8. A method as in claim 1, wherein determining if the background noise is present in the shared media session comprises:
   accessing a voice database, the voice database including participant voice samples associated with the plurality of participants;

comparing the background noise to the participant voice samples; and determining that the background noise is substantially different from the participant voice samples.

9. A method as in claim 1, wherein determining if the background noise is present in the shared media session comprises:

accessing a plurality of profiles associated with the plurality of participants, each of the associated profiles includes noise information describing a type of noise the associated participant has presented in past shared media sessions; and determining a probable type of noise occurring in the shared media session based on the profiles associated with the plurality of participants.

10. A method as in claim 1, wherein selectively muting the shared media session further comprises one of partially muting a data feed associated with a participant and fully muting the data feed associated with the participant.

11. A method as in claim 10, further comprising:

wherein the shared media session comprises a video session; and wherein partially muting the data feed associated with the participant further comprises suppressing visual noise other than the visual representation of the participant from the data feed.

12. A method as in claim 10, further comprising:

wherein the shared media session comprises an audio session; and wherein partially muting the data feed associated with the participant further comprises suppressing audio noise other than the participant's voice from the data feed.

13. A method as in claim 1, wherein the shared media session comprises a virtual environment simulating a physical presence of the participants in a computer generated environment.

14. A method as in claim 1, wherein determining if the background noise is present in the shared media session comprises:

accessing an image database storing a plurality of predetermined images;

comparing an image monitored in the shared media session to the stored images in the image database; and determining that the monitored image is substantially similar to a stored image in the image database.

15. A method as in claim 14, further comprising selectively muting the shared media session by selectively muting the monitored image determined to be substantially similar to a stored image.

16. A method as in claim 1, further comprising:

receiving a third indication that indicates a second data feed associated with a second participant is noisy in the shared media session;

incrementing a second counter associated with the second participant for each indication received about the second participant from unique participants of the plurality of participants;

upon the second counter associated with the second participant exceeding a second threshold associated with the second participant, selectively muting the second data feed associated with the second participant.

17. A method as in claim 16, wherein selectively muting the second data feed associated with the second participant comprises selectively muting at least one of an audio component and a video component of the second data feed.

18. A method as in claim 16, wherein a participant in the shared media session has an associated profile, the associated profile includes history information describing a probability for the participant to be noisy in the shared media sessions.

19. A method as in claim 18, wherein the second threshold associated with the second participant is based at least in part on the associated profile.

20. A method as in claim 1, further comprising:

accessing a profile associated with a participant from the plurality of participants, the profile including a description of a background noise originating from the participant in one or more past shared media sessions; and sending the participant a message that includes the description of the background noise.

* * * * *